United States Patent
Carter, Jr.

[15] 3,704,004
[45] Nov. 28, 1972

[54] GROUND COLLAR

[72] Inventor: William J. Carter, Jr., 4700 La Vista Road, Tucker, Ga. 30084

[22] Filed: Dec. 16, 1970

[21] Appl. No.: 98,703

[52] U.S. Cl. .................................256/1, 256/59
[51] Int. Cl. .................................E04h 17/00
[58] Field of Search ......256/32, 34, 19, 1; 47/24, 25, 47/32, 33

[56] References Cited

UNITED STATES PATENTS

| | | | |
|---|---|---|---|
| 1,235,520 | 7/1917 | Kirfman | 47/25 X |
| 313,424 | 3/1885 | Hughes | 47/25 |
| 1,130,546 | 3/1915 | Scott | 47/25 |
| 1,931,602 | 10/1933 | Colman | 47/25 |
| 2,062,410 | 12/1936 | Garcia | 47/32 UX |
| 2,978,837 | 4/1961 | Daniels | 47/25 |
| 3,005,287 | 10/1961 | Dudley | 47/32 X |
| 3,384,351 | 5/1968 | Turner | 256/32 |

*Primary Examiner*—Dennis L. Taylor
*Attorney*—Walter M. Rodgers

[57] ABSTRACT

For enveloping upright elements such as posts of various cross-sectional configurations at ground level so as to inhibit the growth of vegetation, a collar is formed of flexible, water-resistant sheet material and a main opening is formed therein from which a slit extends to the outer edge of the sheet of material, the slit being for the purpose of facilitating envelopment of a post and the like at ground level. A flange is formed integrally with the sheet and is disposed about the opening formed therein and the opening and flange are configured so as to envelop closely the post or other similar element.

5 Claims, 8 Drawing Figures

PATENTED NOV 28 1972 3,704,004

INVENTOR
WILLIAM J. CARTER, JR.

BY *Walter M. Rodgers*
ATTORNEY

GROUND COLLAR

U.S. Pat. application, Ser. No. 803,146, filed Feb. 28, 1969 now U.S. Pat. 3,571,972 disclosed and claims a ground collar which may be used in conjunction with growing plants, such as trees, and which also may be used to envelop non-living elements such as fence posts and the like. The invention of application Ser. No. 803,146 is especially adapted to conform with the configuration of the outer periphery of the element to be enveloped so as to accommodate the growth of the tree and so as to adapt itself to the various configurations of fence posts and the like.

According to this invention, a ground collar is provided which is especially constructed for use in conjunction with inanimate elements such as fence posts and the like. According to this invention, an opening of fixed size is provided in a flexible, water-resistant sheet of material and a slit is formed in the sheet and extends between the opening and the outer edge thereof. A flange is formed about the opening and disposed in upright normal relationship with respect to the sheet. Thus, by this invention the post is snugly enveloped by the flange in such manner as to prevent seeds from becoming lodged on the ground immediately adjacent to the post and so as to preclude growth of any vegetation of any nature between the post and the flange of the ground collar.

For better understanding of the invention, reference may be had to the following detailed description taken in conjunction with the accompanying drawings in which FIG. 1 is a perspective view of a generally circular fence post about which a ground collar constructed according to this invention is disposed in enveloping relation;

Figure 1:
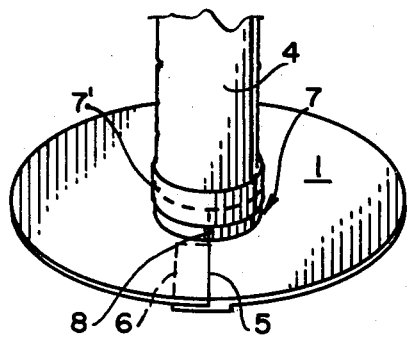
Figure 2:
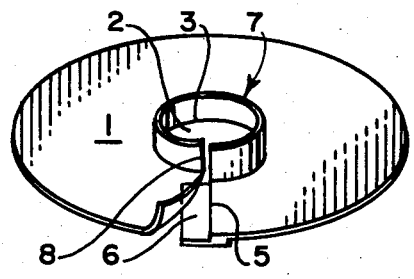
FIG. 2 is a perspective view of the ground collar shown in FIG. 1.

In FIGS. 1 and 2, a unitary flexible sheet 1 of water resistant material is provided with a central aperture 2 the edge 3 of which corresponds in configuration to the periphery of fence post 4. A slit 5, is formed in sheet 1 and extends from the edge 3 of opening 2 to the outer edge of sheet 1. A cover flap 6 is secured to the sheet 1 and is disposed in underlying relationship with respect to slit 5. An upwardly extending unitary flange 7 is formed about the edge 3 of opening 2 and snugly envelops the outer periphery of post 4. Adhesive tape 7' snugly envelops the upper edge of flange 7 and secures such edge to the post.

From the above description and with reference to FIGS. 1 and 2, it is apparent that by the invention, flange 7 and adhesive tape 7' effectively precludes the disposition of weed and grass seeds and the like on the ground immediately adjacent the periphery of post 4 such as might be placed there by wind or by other means. Furthermore, the fact that flange 7 is disposed in substantially normal relationship to the flexible sheet 1 and in snugly enveloping relationship to post 4, precludes access of sunlight and rain to the region of the ground immediately adjacent the periphery of post 4. Thus any tendency for vegetation to grow alongside post 4 is effectively precluded not only by the flexible sheet 1 but by the flange 7. Since this invention is especially adapted for use in conjunction with non-living devices such as fence posts, it is possible to dimension the opening in sheet 1 and the flange 7 in such manner as virtually to preclude any possibility of growth of vegetation in the region immediately adjacent to the periphery of post 4.

In order to facilitate placement of the ground collar including sheet 1 and its flange 7 about a post such as 4, a slit 8 is formed in the flange 7 and the lower end thereof is in substantial coincidence with the inner end of slit 5 as is obvious in FIG. 2.

Figure 3:
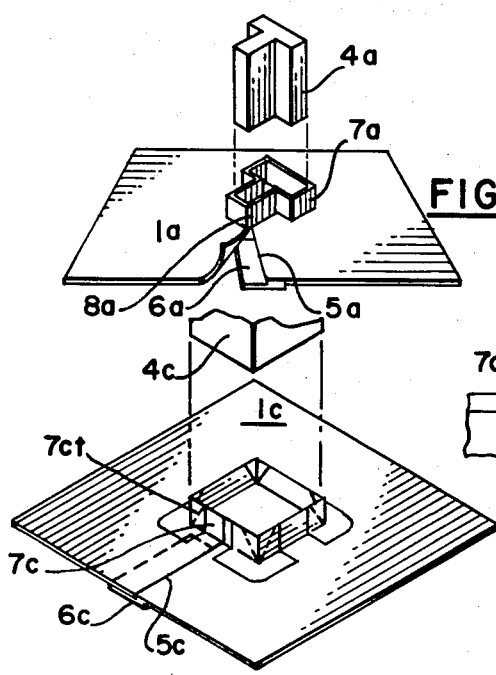
FIG. 3 is a view similar to FIG. 1 but which depicts a post of T-shaped cross-sectional configuration.

FIG. 3 differs from FIG. 1 in that the post 4a is of generally T-shaped cross-section and flange 7a is similarly constructed so as to closely envelop the outer surfaces of post 4a. Slit 5a and its associated cover flap 6a are provided, and slit 8a is formed in flange 7a and the lower end thereof coincides with the inner end of slit 5a.

Figure 4:
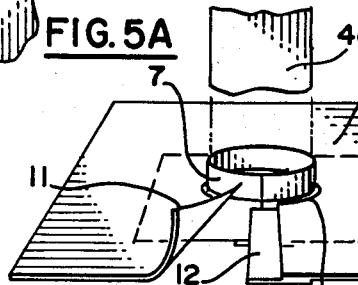
FIG. 4 is a view generally similar to FIGS. 1 and 3 but which depicts a post whose cross-sectional configuration is that of a channel member.

The arrangement of FIG. 4 is similar to that of FIGS. 1 and 3 except the post of FIG. 4 as identified by the numeral 4b is configured in the shape of a channel. Likewise, the flange 7b is formed as a continuous wall which envelops the surfaces of the post 4b.

Figure 5A:
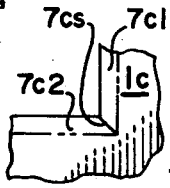
FIG. 5 is a view similar to FIGS. 1, 3 and 4 but which depicts the invention as applied to a post of square or rectangular configuration.
Figures 5, 6:
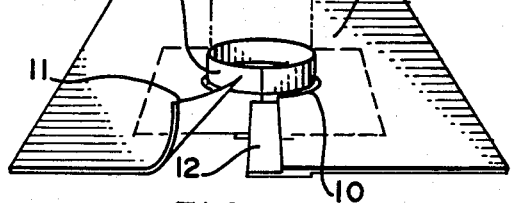
FIG. 6 is a view similar to FIG. 1 to which a supplemental sheet has been added.

FIG. 5 depicts an arrangement similar to FIGS. 1, 3 and 4, except that FIG. 5 is especially adapted for use in conjunction with a square or rectangular post 4c. FIG. 5A is a fragmentary view of a portion of FIG. 5 and shows that flange 7c is formed of a plurality of flaps such as are designated at 7c1 and 7c2, separated by a corner slit 7cs. Thus, with the parts assembled as shown in FIG. 5, flaps 7c1 and 7c2 are disposed in normal relationship with sheet 1c and closely adjacent to the outer surfaces of post 4c. Suitable tape such as is designated at 7ct, may be used to envelop the corners of the flange 7c and to bridge the gap formed when the flaps such as 7c1 and 7c2 are folded upwardly.

For the purpose of effectively enlarging the area covered by a sheet such as 1, 1a, 1b, or 1c, a flat unitary supplementary sheet such as that designated by the numeral 9 in FIG. 6 may be employed. This sheet is provided with a central aperture 10 which is configured so as to envelop the associated flange of the underlying cover sheet shown in dotted lines in FIG. 6. In addition, a slit 11 is formed in sheet 9 and extends from the opening 10 formed therein to the outer edge of the sheet and a cover flap 12 is arranged so as to overlie slit 11 when the parts are assembled in their service positions. Thus by the modification of the invention depicted in FIG. 6, the circular flange such as is designated by the numeral 7 is disposed inside the opening 10 formed in supplementary sheet 9. Preferably sheet 9 should be finished to simulate the appearance of grass, pinestraw or other ground cover.

Figure 7:
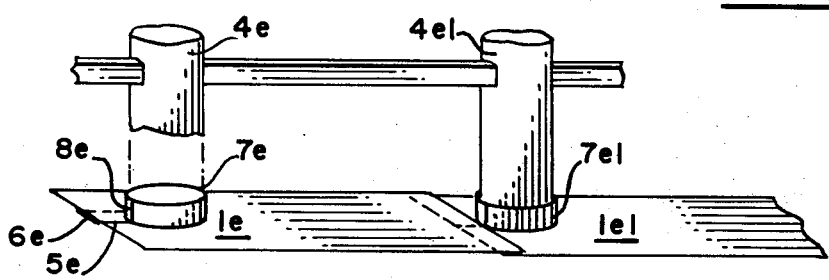
FIG. 7 is a view depicting means for use in conjunction with a fence and which utilizes a collar similar to that depicted in FIGS. 1 and 2.

The invention is particularly well suited for use in conjunction with fences and such application of the invention is represented in FIG. 7. In FIG. 7, the sheet is elongated and the flange 7e is disposed at one end of sheet 1e with the slit 5e formed adjacent to one end of the sheet. A slit 8e is formed in flange 7e and its lower end coincides with slit 5e. The cover flap is shown in dotted lines and is designated by the numeral 6e.

With the arrangement shown in FIG. 7, one unit 1e may be used to envelop the post such as 4e and another unit such as 1e1 may be used with its flange 7e1 arranged in an enveloping relationship relative to the post 4e1. Of course, the adjacent ends of sheets 1e and 1e1 are disposed in overlying relationship so that, by the arrangement of FIG. 7, the growth of vegetation is prevented underneath the fence itself as well as around the posts thereof.

For holding the ground collar and the supplementary sheet in snug engagement with the ground, a plurality of pins could be used as disclosed in U.S. application Ser. No. 803,146 filed Feb. 28, 1969.

The embodiments of the invention in which an exclusive property or privilege is claimed are defined as follows:

1. A ground collar for enveloping at ground level an inanimate upright element whose periphery at ground level is of fixed and unchanging size and of predetermined configuration, said collar comprising a unitary cover sheet of flexible water resistant material, an opening formed in said sheet and being of similar configuration and size to the periphery of said element at ground level, a slit formed in said sheet and extending from its outer edge inwardly to the edge of said opening to facilitate envelopment of said element by said sheet, a cover flap disposed in overlying relation with respect to said slit, and an upwardly extending flange formed about the periphery of said opening and disposed in generally normal relation to said sheet and adapted to completely enclose and snugly engage the upright element about its entire periphery, said flange being severed along a generally vertical line the lower extremity of which coincides substantially with the inner end of said slit.

2. A collar according to claim 1 wherein adhesive tape is secured to at least a part of the exterior surface of said flange and the adjacent surface of the element about the entire peripheries thereof so as to form a growth preventing junction therebetween.

3. A collar according to claim 1 wherein the element is T-shaped in cross sectional configuration and wherein said opening and flange are of corresponding size and configuration.

4. A collar according to claim 1 wherein the element is channel shaped in cross sectional configuration and wherein said opening and flange are of corresponding size and configuration.

5. A collar according to claim 1 wherein said cover sheet is of elongated generally rectangular configuration and wherein said opening and flange are disposed near one end thereof.

* * * * *